W. H. FULCHER.
PROCESS OF AND APPARATUS FOR MAKING PULP BOTTLE BODIES.
APPLICATION FILED JULY 26, 1915.
1,266,449.
Patented May 14, 1918.
13 SHEETS—SHEET 1.
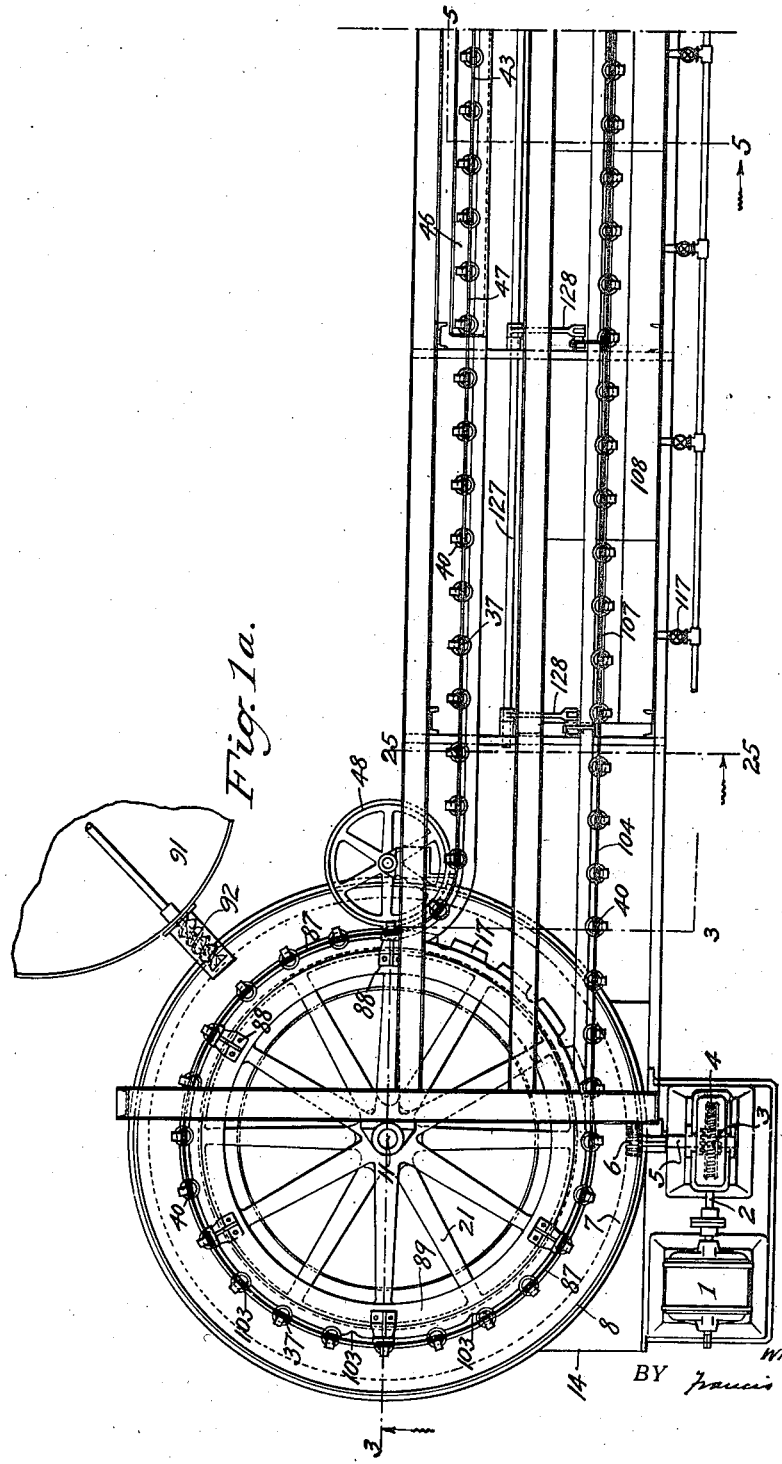

W. H. FULCHER.
PROCESS OF AND APPARATUS FOR MAKING PULP BOTTLE BODIES.
APPLICATION FILED JULY 26, 1915.
1,266,449.
Patented May 14, 1918.
13 SHEETS—SHEET 2.
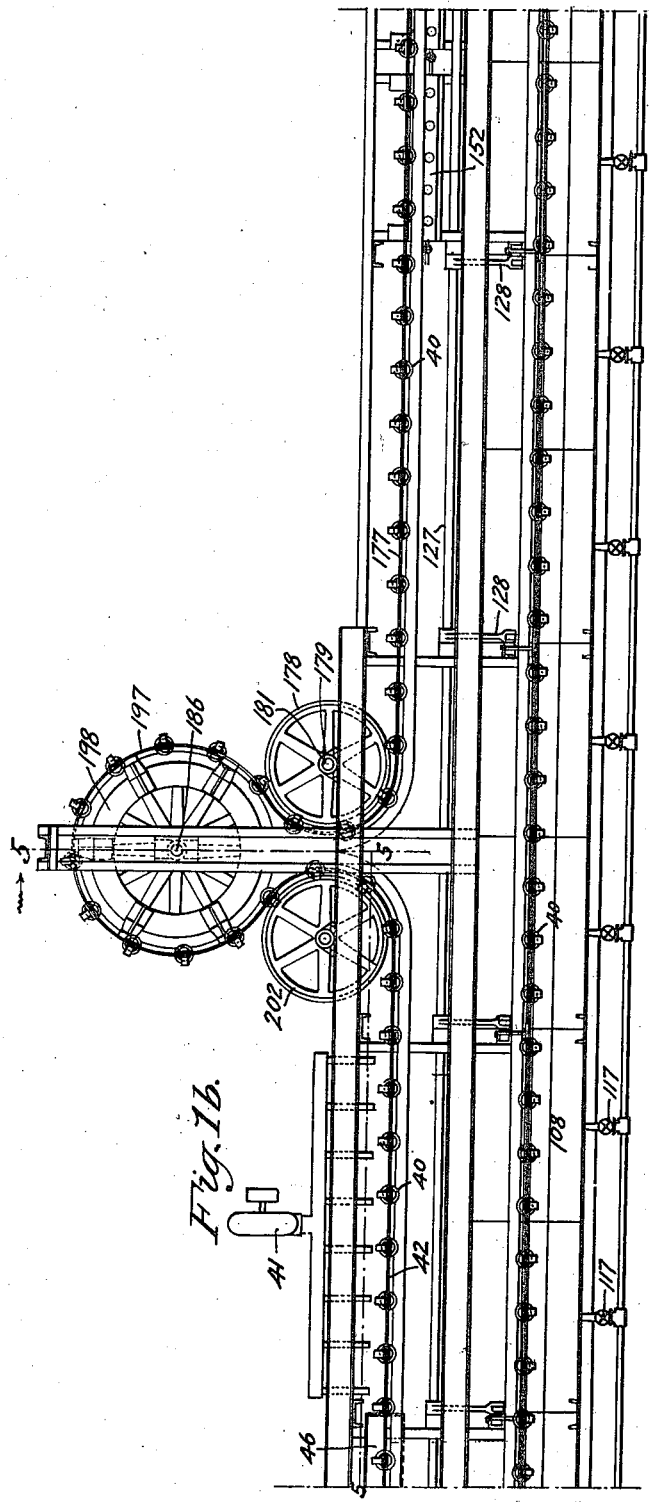
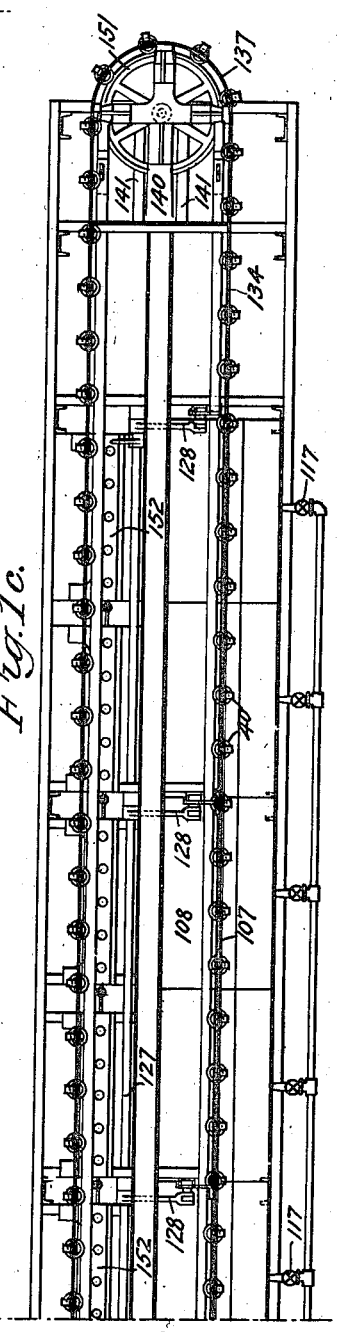
INVENTOR.
William H. Fulcher
BY
Francis M. Wright
ATTORNEY W. H. FULCHER.
PROCESS OF AND APPARATUS FOR MAKING PULP BOTTLE BODIES.
APPLICATION FILED JULY 26, 1915.
1,266,449.
Patented May 14, 1918.
13 SHEETS—SHEET 3.
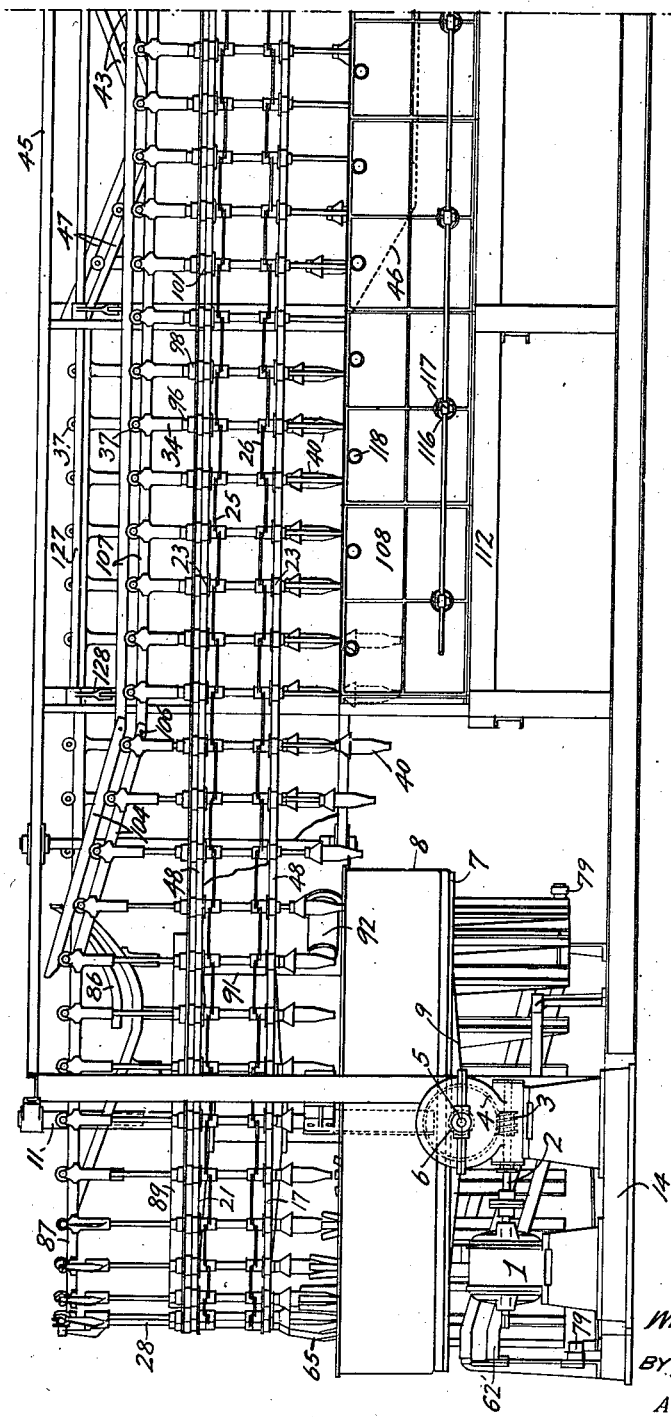
INVENTOR.
William H. Fulcher
BY Francis M. Wright
ATTORNEY

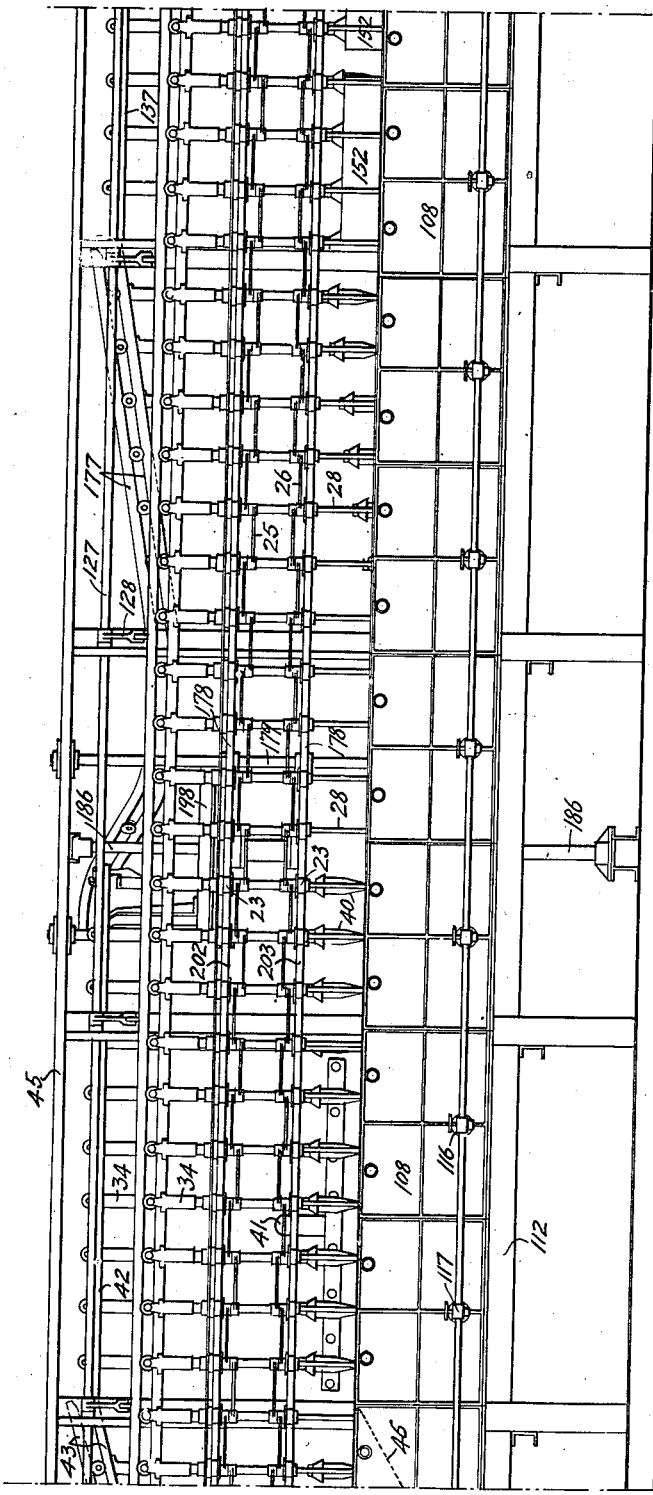

W. H. FULCHER.
PROCESS OF AND APPARATUS FOR MAKING PULP BOTTLE BODIES.
APPLICATION FILED JULY 26, 1915.
1,266,449.
Patented May 14, 1918.
13 SHEETS—SHEET 5.
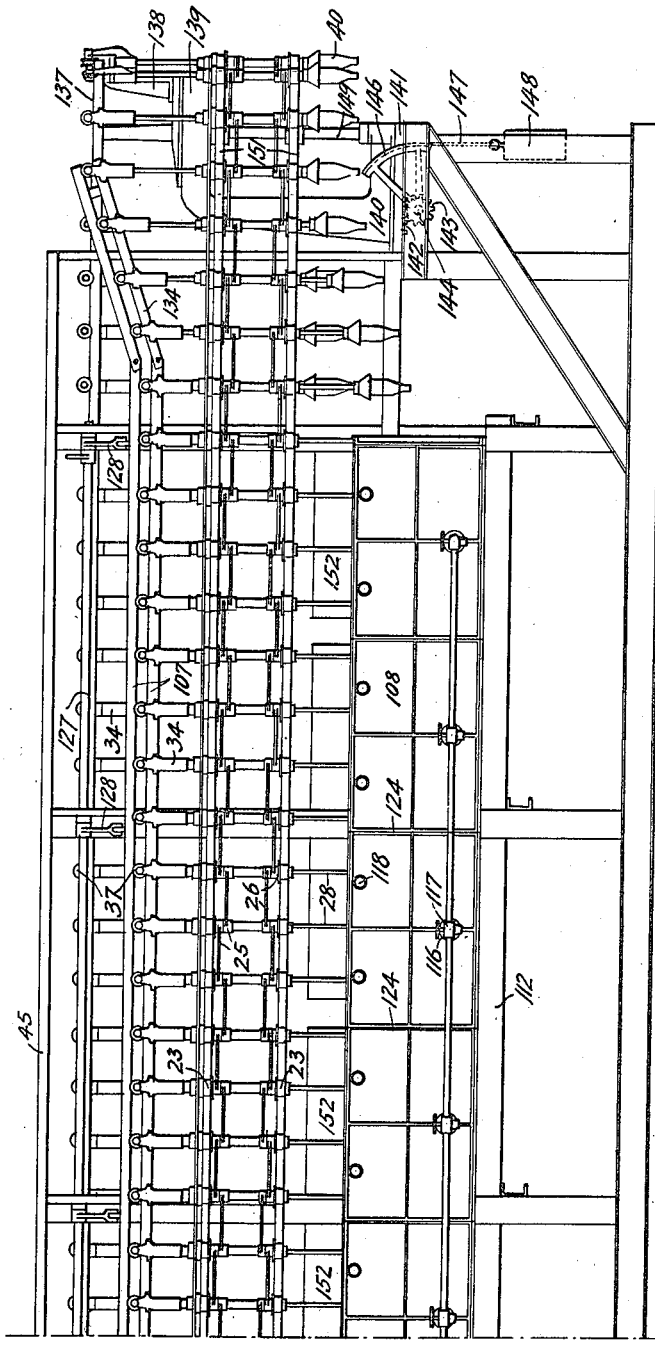
INVENTOR.
William H. Fulcher
BY
ATTORNEY

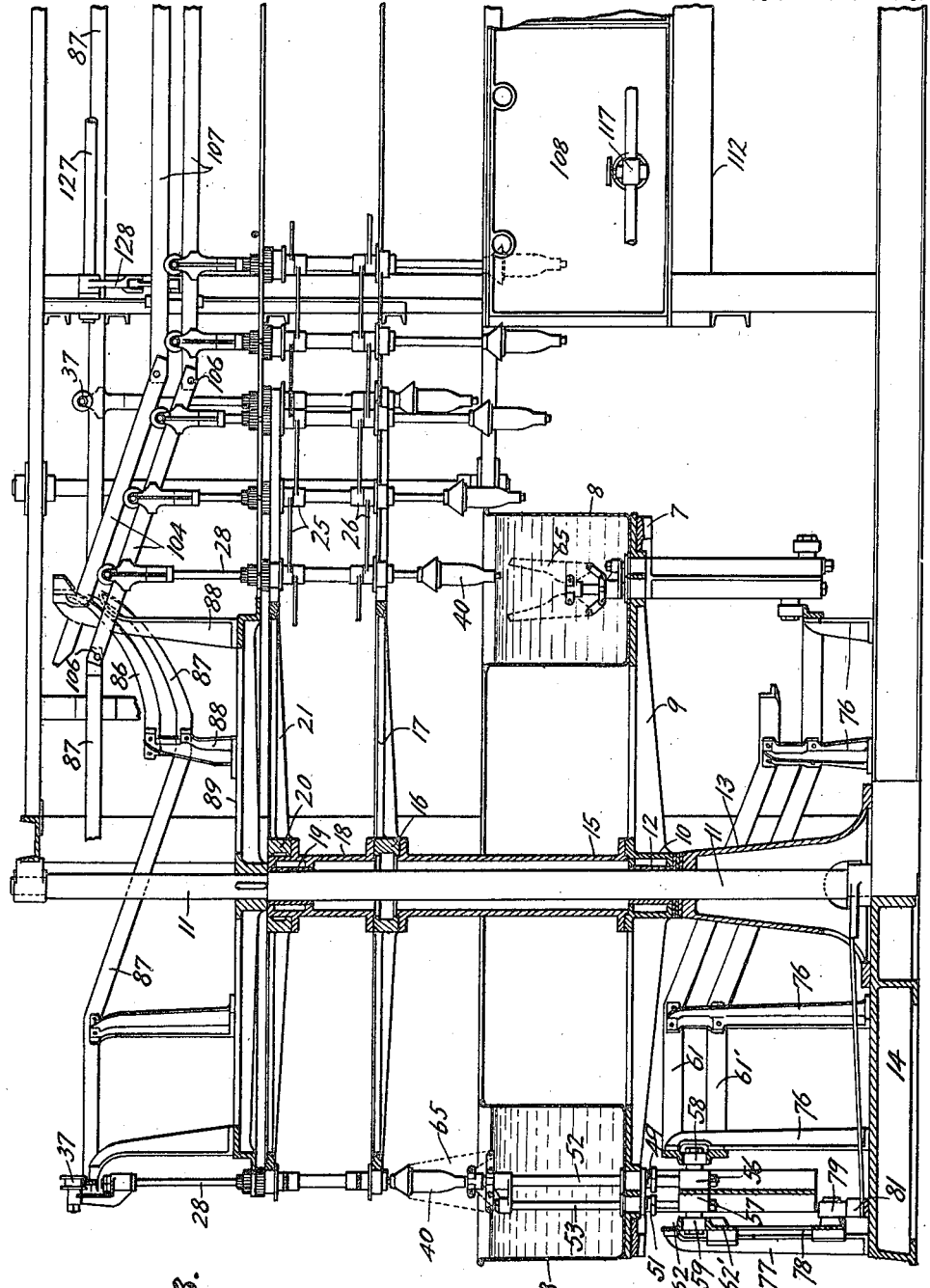

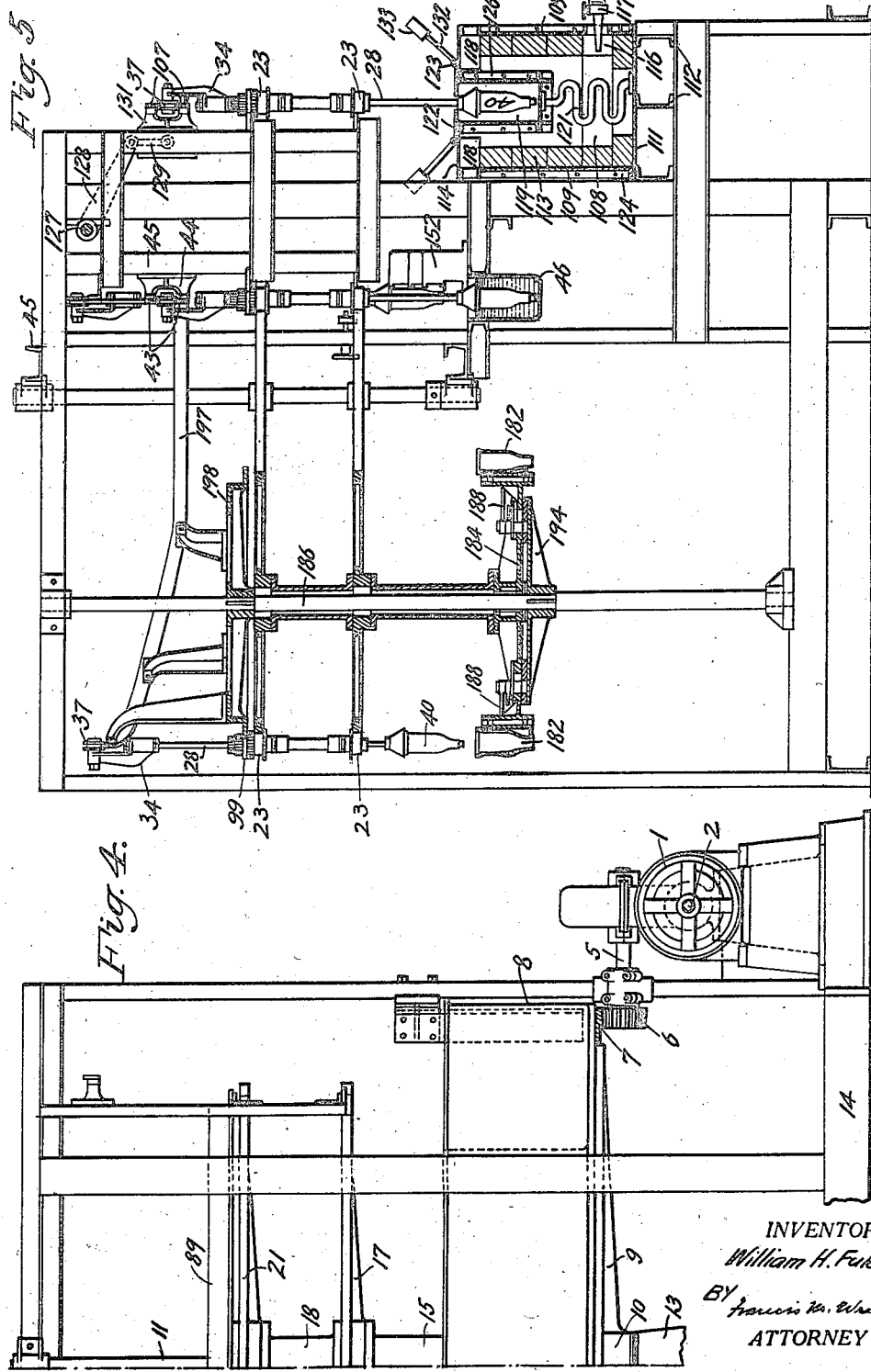

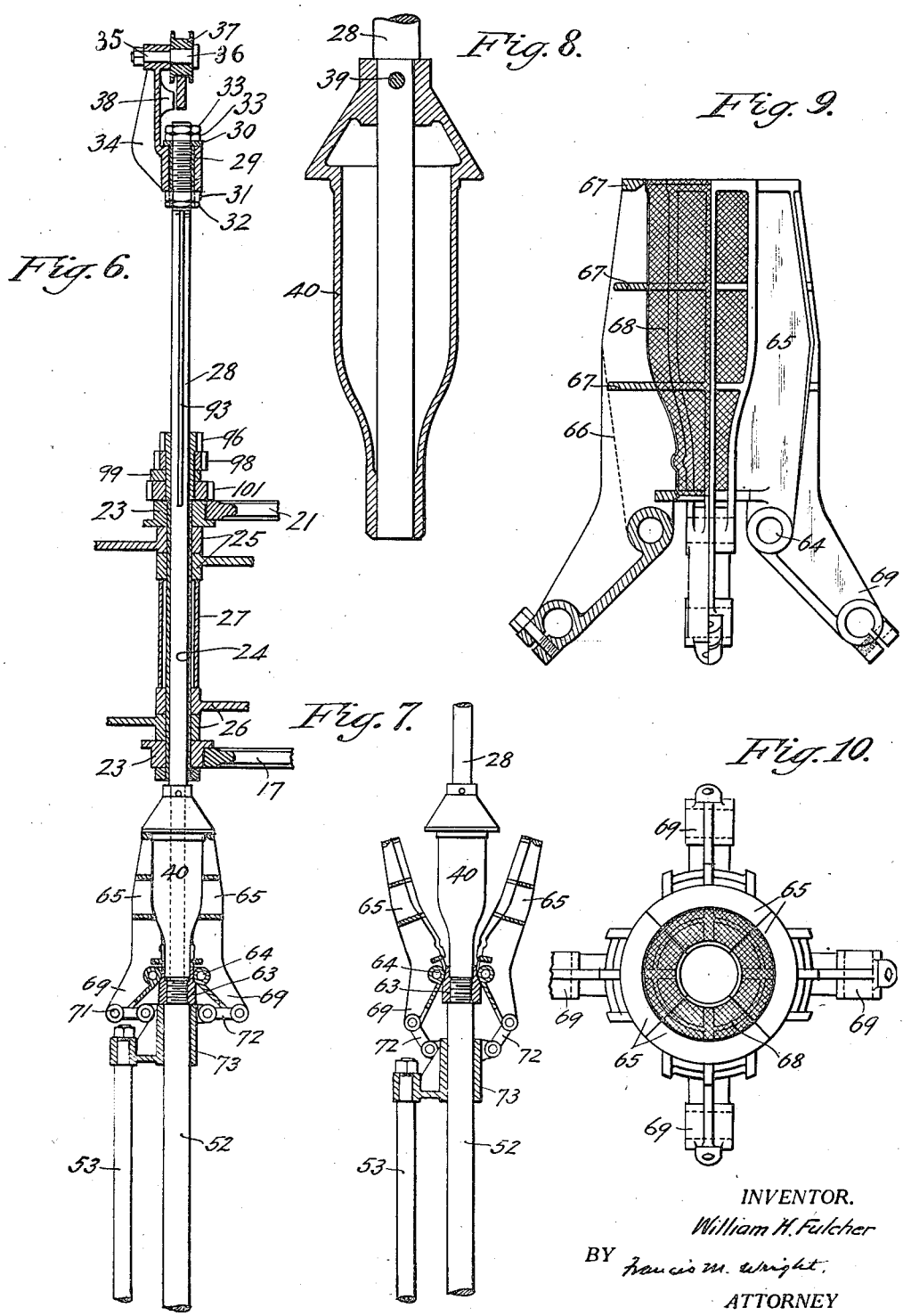

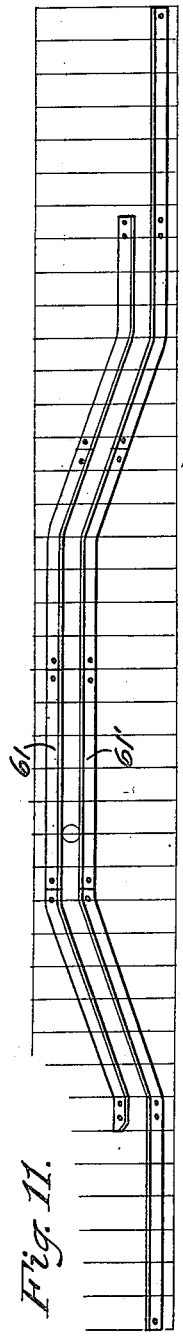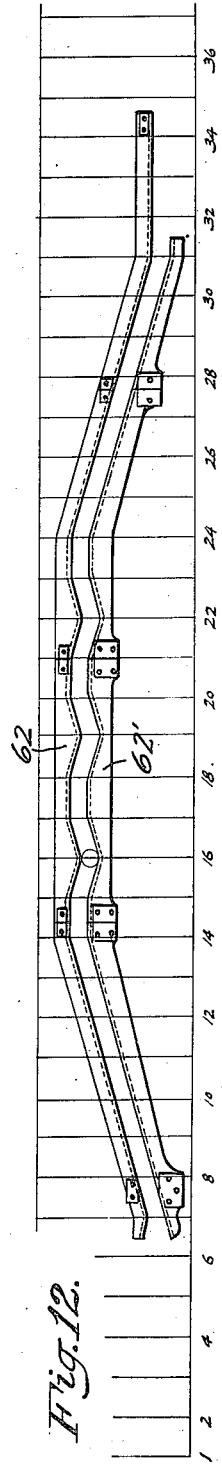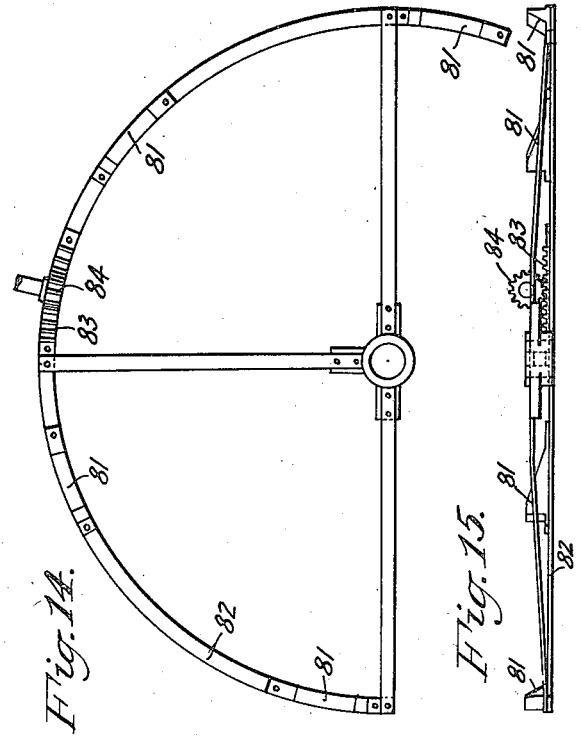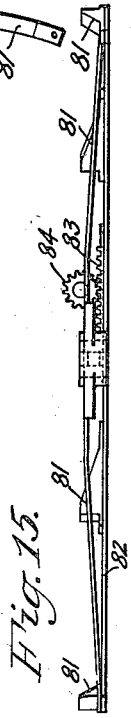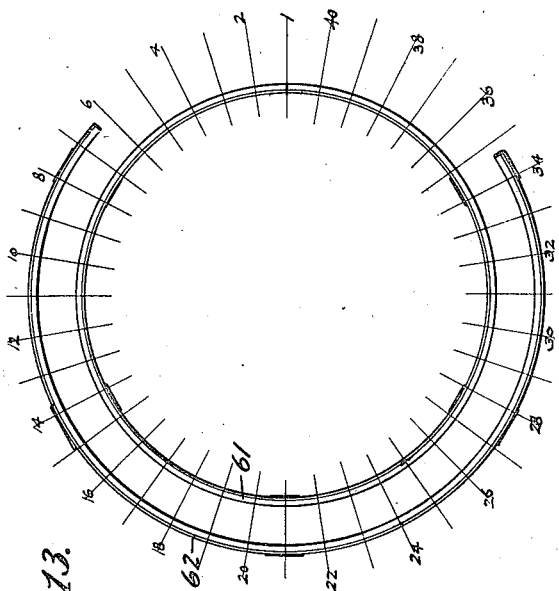

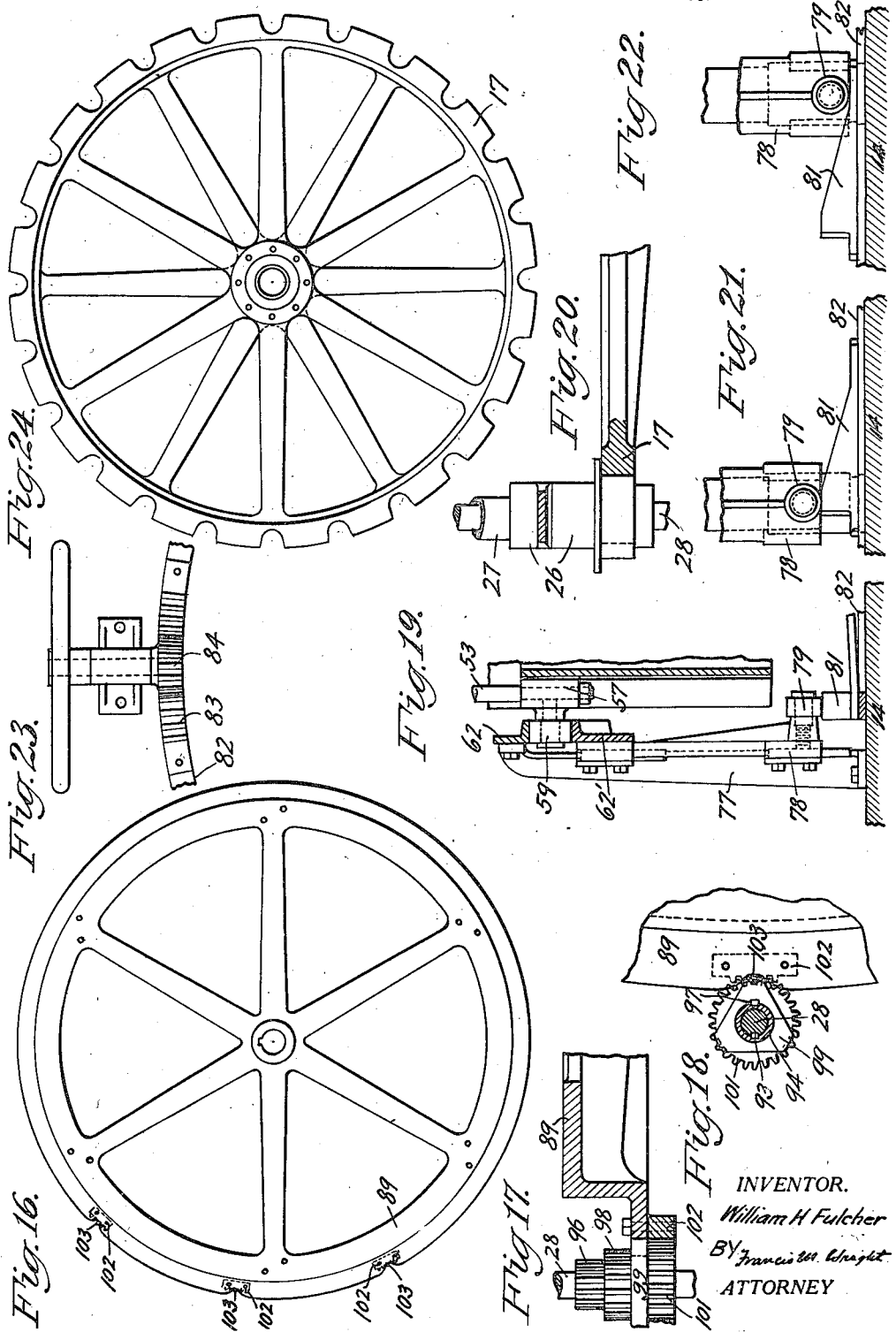

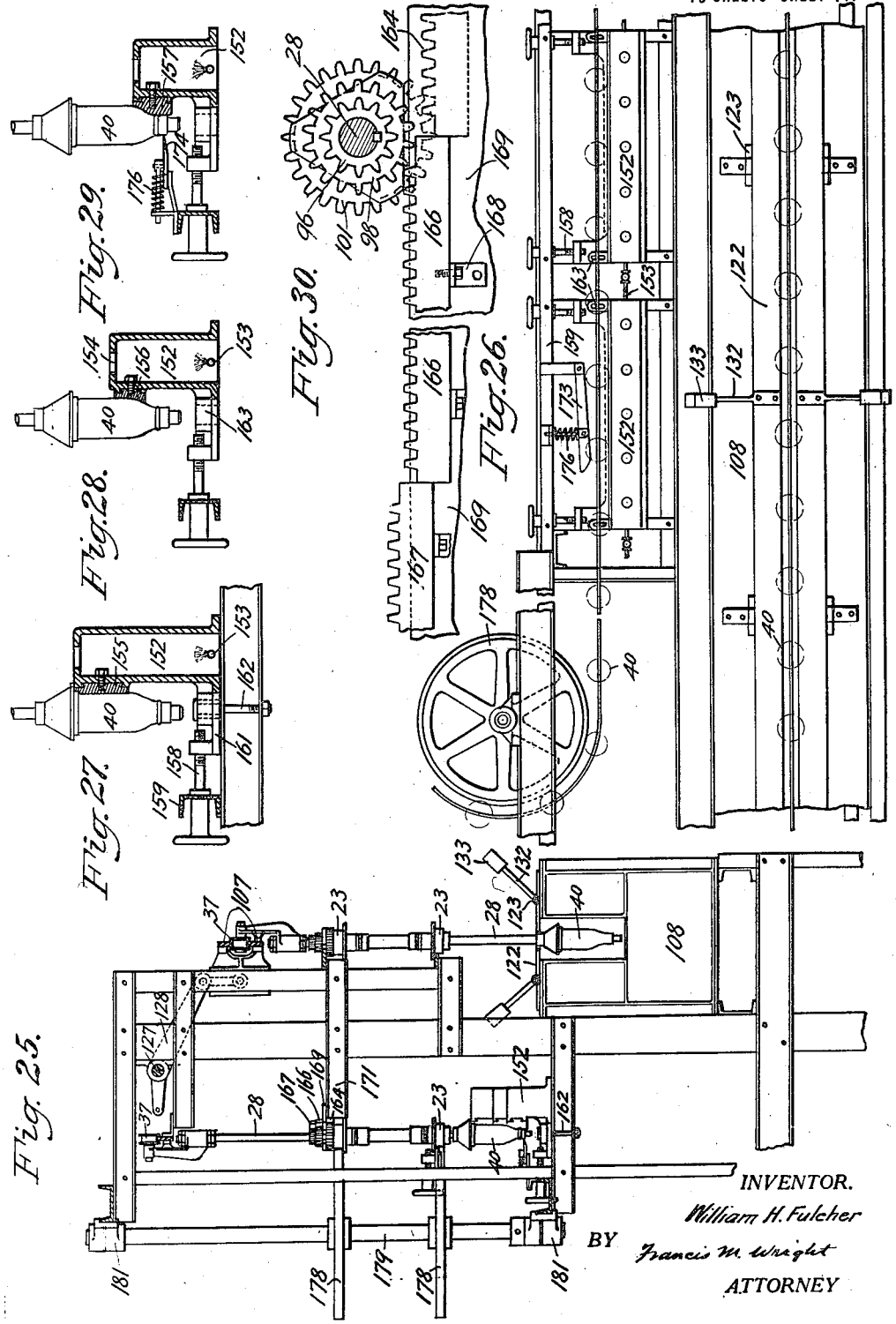

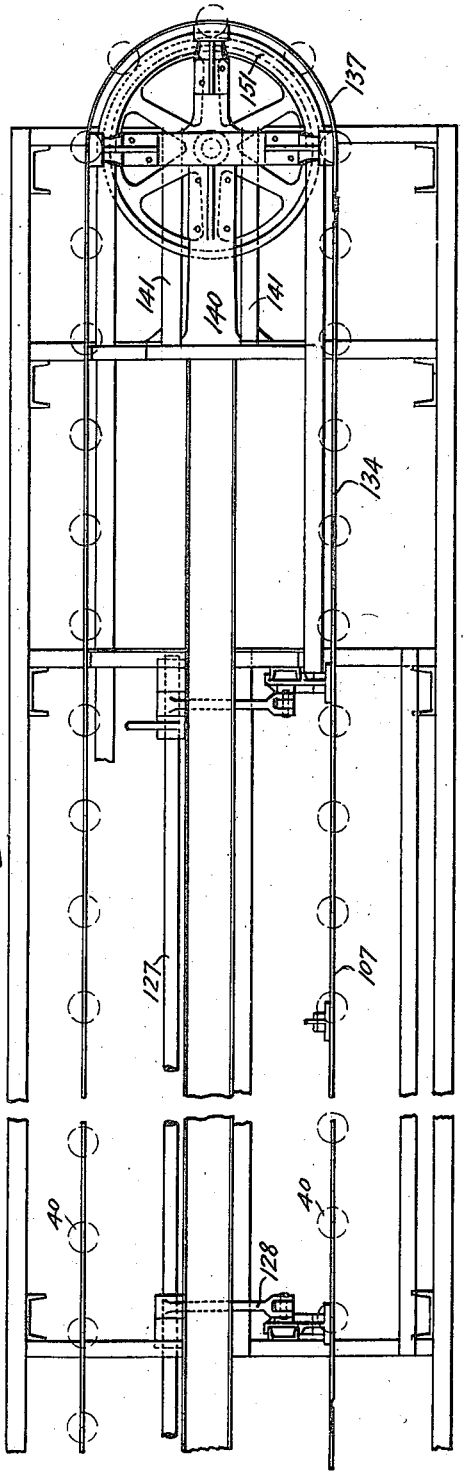
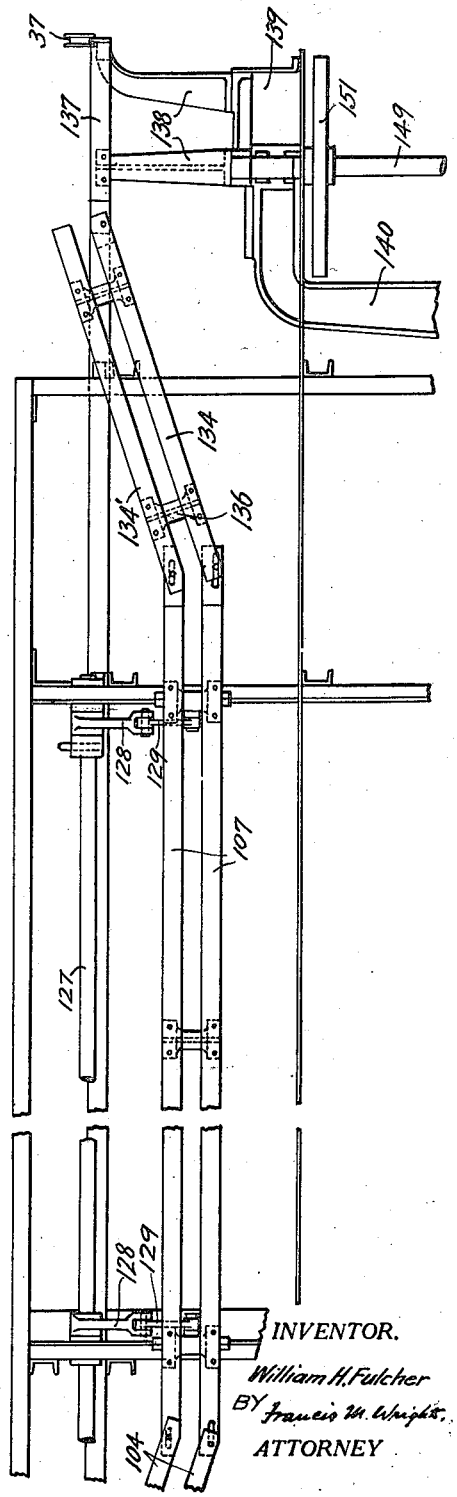

W. H. FULCHER.
PROCESS OF AND APPARATUS FOR MAKING PULP BOTTLE BODIES.
APPLICATION FILED JULY 26, 1915.
1,266,449.
Patented May 14, 1918.
13 SHEETS—SHEET 13.
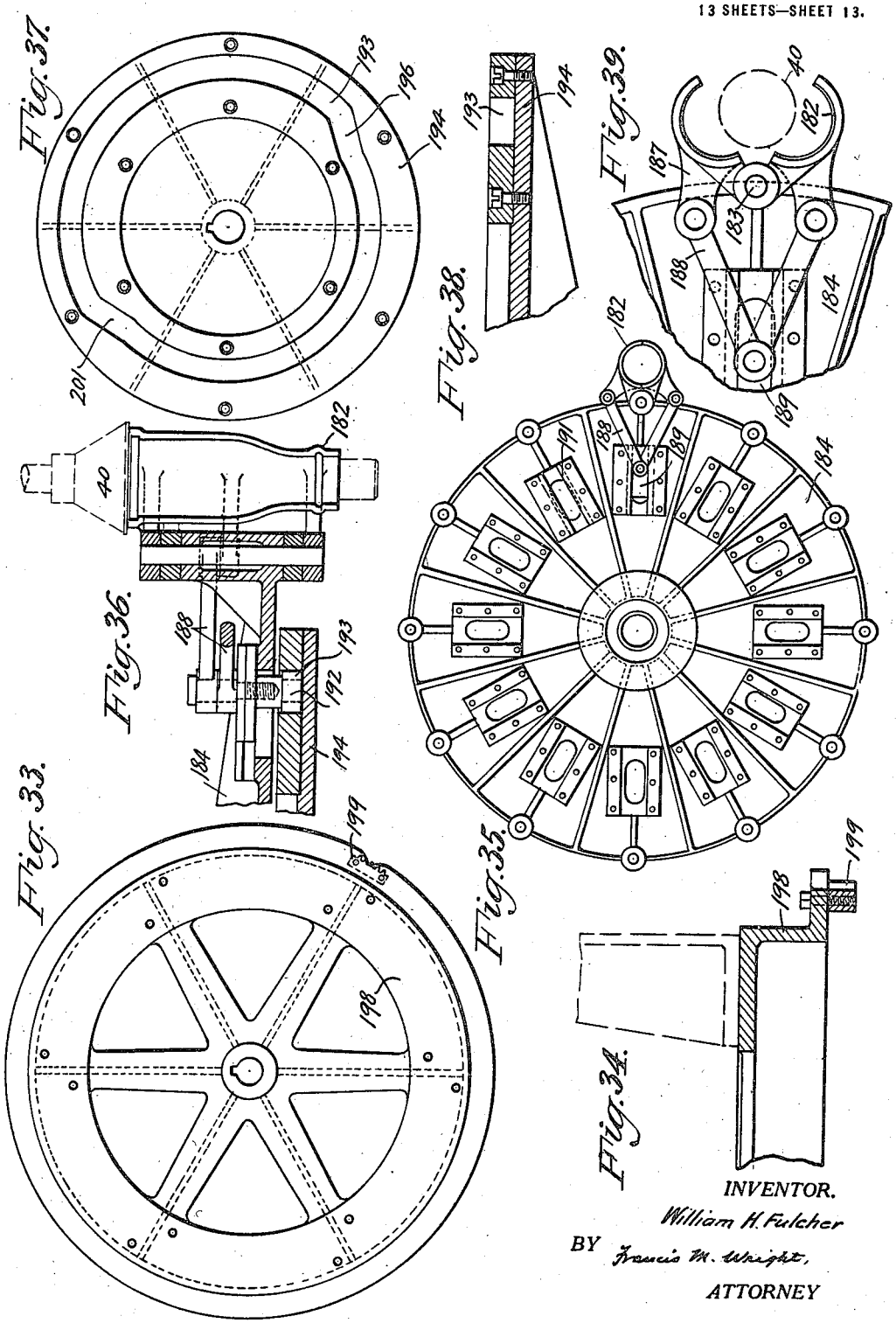
INVENTOR.
William H. Fulcher
BY Francis M. Wright,
ATTORNEY

UNITED STATES PATENT OFFICE.

WILLIAM H. FULCHER, OF OAKLAND, CALIFORNIA, ASSIGNOR TO FULCHER PULP BOTTLE COMPANY, OF OAKLAND, CALIFORNIA, A CORPORATION OF CALIFORNIA.

PROCESS OF AND APPARATUS FOR MAKING PULP BOTTLE-BODIES.

1,266,449.

Specification of Letters Patent.

Patented May 14, 1918.

Application filed July 26, 1915. Serial No. 41,901.

*To all whom it may concern:*

Be it known that I, WILLIAM H. FULCHER, a citizen of the United States, residing at Oakland, in the county of Alameda and State of California, have invented new and useful Improvements in Processes of and Apparatus for Making Pulp Bottle-Bodies, of which the following is a specification.

The object of the present invention is to provide a process of, and apparatus for, continuously making hollow ware, such as the bodies of bottles, especially milk bottles, from paper pulp, at the same time impregnating them with paraffin so as to render them water-proof, and imparting thereto a smooth and hard outer surface.

In the accompanying drawing, Figure 1ª is a plan view of a terminal portion of my improved apparatus; Fig. 1ᵇ is a similar view of a central portion thereof; Fig. 1ᶜ is a similar view of the other terminal portion thereof; Fig. 2ª is a front view of one terminal portion; Fig. 2ᵇ is a similar view of a central portion; Fig. 2ᶜ is a similar view of the other terminal portion; Fig. 3 is an enlarged longitudinal section, certain parts being shown in side elevation, of a terminal portion of the machine; Fig. 4 is a broken end view thereof; Fig. 5 is a transverse vertical section thereof on the line 5—5 of Fig. 1ª; Fig. 6 is an enlarged broken detail vertical section of a core carrier and parts immediately connected therewith, certain parts being shown in side elevation; Fig. 7 is a view similar to Fig. 6 of parts shown therein, some parts being in positions different from those in Fig. 6; Fig. 8 is an enlarged vertical section of a core; Fig. 9 is a side view, certain parts being shown in vertical section, of a mold in its closed position; Fig. 10 is a plan view of the same; Fig. 11 is a developed diagrammatic view of cam tracks for raising and lowering a mold; Fig. 12 is a similar view of cam tracks for operating mold sections; Fig. 13 is a diagrammatic plan view of the tracks shown in Fig. 11; Fig. 14 is a plan view of cams for adjusting cam tracks and means for operating said cams; Fig. 15 is a side view of the same; Fig. 16 is a plan view of a disk, illustrating means for turning a core; Fig. 17 is an enlarged sectional view of the same, showing also means coöperating therewith; Fig. 18 is a horizontal sectional view of the parts shown in Fig. 17; Fig. 19 is a broken side elevation showing means for raising and lowering a cam track; Fig. 20 is a broken horizontal section of an idle wheel and parts coöperating therewith; Fig. 21 is a detail side elevation of the cam shown in Fig. 19; Fig. 22 is a detail side elevation of a similar cam; Fig. 23 is a broken plan view of controlling means for said cams; Fig. 24 is a plan view of a sprocket wheel; Fig. 25 is a partial transverse section of the apparatus, showing the oven in end elevation; Fig. 26 is a broken plan view of a portion of the apparatus showing ironers; Figs. 27, 28 and 29 are vertical sections of three ironers; Fig. 30 is a broken plan view of three racks for actuating said ironers; Fig. 31 is a plan view of a portion of the apparatus, showing in detail the means for elevating the cores; Fig. 32 is a front elevation of the same; Fig. 33 is a plan view of a disk for turning a core; Fig. 34 is a broken vertical section of the same; Fig. 35 is a plan view of mechanism for gripping the pulp body; Fig. 36 is a detail vertical section of the same; Fig. 37 is a cam for operating said mechanism; Fig. 38 is an enlarged broken vertical section of said cam; Fig. 39 is a detail plan view of the mechanism shown in Fig. 35.

Referring to the drawing, 1 (Figs. 1ª, 2ª, 4) indicates an electric motor, by which is rotated a shaft 2 carrying a worm 3 meshing with a worm wheel 4 on a shaft 5 carrying a bevel pinion 6 meshing with a bevel gear 7 (Fig. 4) on the under side of an annular tank 8, supported by arms 9 extending radially from a sleeve 10 around a stationary shaft 11 having a bronze bushing 12, and rotatably supported upon a pedestal 13 mounted on a base 14. To said sleeve is secured around the shaft 11 a tube 15, to the upper end of which is secured the hub 16 of a sprocket wheel 17, (Fig. 24) to which hub is secured a second tube 18, which rotates around a bronze bushing 19 on the shaft 11, and which carries the hub 20 of a second sprocket wheel 21. In recesses 22 in the peripheries of said sprocket wheels 17 and 21 are received rollers 23 (Fig. 6) around the upper and lower ends of tubes 24, which pass through apertures in the enlarged ends of upper and lower pairs of links 25, 26, spaced from one another by spacing tubes 27. In said tubes 24 are stems 28, of which the upper ends are threaded and are screwed into bronze bushings 29 having flanges or heads 30, and the lower ends are threaded. Nuts 31 and lock nuts 32 are screwed on the lower ends of said bushings, and nuts 33 are screwed on the upper ends of said stems. Said bushings can rotate in bearings in lower portions of hangers 34, the upper ends of which can rotate upon reduced portions 35 of horizontal shafts 36 of flanged rollers 37, rolling on tracks hereinafter more particularly described. Said hangers have lateral extensions 38 to guide them properly on the tracks. To the lower ends of said stems 28 are secured by pins 39 (Fig. 8) hollow cores 40.

At the commencement of the cycle of operation the core has just been extracted from a finished body, and is, for reasons which will hereafter appear, at a comparatively high temperature. It is therefore necessary to cool it, which is done by air blasts from a blower 41 (Fig. 1ᵇ) directed against the cores as they travel by means of the hangers suspended from tracks 42. The core is then, by means of a cam track 43, supported by standards 44 from a frame 45 caused to descend into a tank 46 containing molten paraffin, and is then, by a cam track 47, raised from said tank, having been coated with paraffin. It is then, by means of idle wheels 48, guided to a position over said annular tank and travels around the shaft 11 at the same angular speed as said tank. In the bottom of the tank are pairs of stuffing boxes 49, 51 (Fig. 3) through which can slide lifter rods 52 and 53 to lower portions of which are secured, as shown at 54, (Figs. 3, 19) rectangular blocks 56, 57, from which project laterally shafts carrying rollers 58, 59. These rollers are caused to rise and descend by pairs of cam tracks 61, 61' and 62, 62', supported as hereinafter described. The upper end of the lifter rod 52 is threaded (Fig. 6) and screwed thereon is a bracket 63 having equally spaced bearings 64 to which are pivoted mold sections 65, here shown as four in number. Each mold section comprises a skeleton frame having vertical ribs 66 and horizontal ribs 67 and faced with wire netting 68. Said mold sections when closed together form a mold around the core 40 and at a distance therefrom corresponding to the thickness of the pulp bottle body which is to be made. Each mold section 65 has an outwardly extending arm 69 pivotally connected at its outer end, as shown at 71, with one end of a link 72, the other ends of all of which links are pivotally connected to a sleeve 73 slidable on the lifter rod 52, and secured to the top of the lifter rod 53, so that, when said lifter rod 53 is raised relatively to the lifter rod 52, as in the position shown in Fig. 6, all the mold sections are closed to form a complete mold, and when it is lowered, as in the position shown in Fig. 7, the mold sections are open.

The inner cam tracks 61, 61' are supported directly upon standards 76 erected on the base 14, and the outer cam tracks 62, 62' are supported, the upper one 62 upon similar standards 77 and the lower 62' upon vertical slidable uprights 78 guided by said pedestals, the lower ends of said uprights being supported by the shafts of rollers 79, which are supported on circular cams 81, particularly shown in Figs. 14 and 15. The object of this construction is to enable the rollers 59 supported by the outer cam tracks to be dropped whenever desired, as, for instance, when the operation of the machine is stopped for a considerable period of time, as during the night time, and, for this purpose, said cams 81 are mounted upon a segmental wheel 82 rotatable upon the shaft 11 and having thereon a short rack 83 actuated by a pinion 84 rotatable by hand, so that, by turning said pinion, said segment wheel can be turned through a short arc, and all of the rollers 79, supported upon the upper portions of the cams, can be allowed to drop to the lower portions of said cams, thereby causing the lower outer track 62', and the rollers 59, supported thereon, also to drop, and thereby causing the mold sections which are operatively related thereto to open and be separated from the cores.

After leaving the idle wheels 48, the rollers 37 of the core hangers are received in the recesses of the sprocket wheels 17, 21. Immediately thereafter the cores are caused to descend by an upper cam track 86 operating in conjunction with a lower track 87 both of which are supported by uprights 88 on a disk 89 fast on a reduced upper portion of the stationary shafts 11, and incline downwardly, and have a helical form, so that the core is forced downward into a position between the four mold sections 65, which are rotating with the annular tank, and at this point are open or separated from one another.

The tank contains paper pulp mixed with sufficient water to render it freely fluid, and since, as will be hereinafter described, the water is squeezed out of the paper pulp when it has been formed into a bottle body, and it is necessary to preserve the fluid pulp at a uniform consistency, the pulp itself is fed from a suitable reservoir 91 to the tank containing a mixture of pulp and water by means of a screw feeder 92, which is caused to rotate at a uniform speed, regulated in any suitable manner.

The relative movements of the mold as a whole and of the mold sections to and from each other will be best understood by referring to Figs. 11, 12 and 13, of which Fig. 11 is a diagram of the inner pair of cam tracks 61, 61', for raising the mold as a whole, Fig. 12 is a similar diagram of the outer pair of cam tracks 62, 62' for operating the several mold sections, and Fig. 13 is a plan view of the tracks, having thereon indicating division numerals corresponding to those of like parts of the diagrams of Figs. 11 and 12. It will be seen that the lower inner cam track 61' is continuous, whereas the upper inner cam track 61 and both the outer cam tracks 62 and 62' are incomplete. It will also be seen, on comparing Fig. 13 with Figs. 11 and 12, that the core descends into its central position between the mold sections at about the time when the mold section has been rotated from a central longitudinal or initial position, indicated by the division numeral 40, through a distance a little greater than 6/40ths of the entire circumference. At this time it will be seen on reference to the diagram in Fig. 12, that the lower outer cam track 62' controlling the roller 59 which operates the outer lifter rod, begins to rise, while, as seen from the diagram in Fig. 11, the inner cam tracks remain level, so that the mold sections close. When they have traveled through 8/40ths of their entire revolution the mold sections have closed, and both pairs of cam tracks rise, so that the core, mold and pulp contained between them is raised from the tank. Both pairs of cam tracks rise through 6/40ths of a revolution, so that, when the mold has rotated through 14/40ths of a revolution from its initial point, they are both out of the pulp in the tank, but the mold sections are still closed, and the pulp forming the paper bottle is still pressed tightly between said mold sections and the core. The water is thereby squeezed out of the bottle body through the interstices of the wire netting.

If the mold sections were finally removed from the body of the pulp after it has arrived at this point there would remain on said body four vertical ridges where the four mold sections come together. A body of this form is undesirable and therefore I provide means for avoiding said ridges and imparting a smooth outer surface to the bottle by compressing said body between the core and the mold sections repeatedly after turning the core, and the body held thereon, relatively to the mold sections. For this purpose the stem 28 has formed therein a keyway 93 by means of which there is keyed to said stem, but slidable relatively thereto, a tube 94 (Figs. 6, 17, 18) formed on its upper end with a gear wheel 96 to which tube in succession are keyed, as shown at 97, a gear wheel 98, a triangular guide 99, the purpose of all of which will hereinafter appear and a gear wheel 101. Said gear wheel 101 is adapted to engage in succession short racks 102 secured on the under side of the stationary disk 89, which disk immediately over said racks is recessed, as shown at 103, to allow the corners of the triangular guide to be received therein and said guide to turn with said gear wheel 101 on said stem. Between said recesses the straight sides of the triangular guide 99 engage the edge of the disk and prevent turning movement of the gear wheel 101 and of the stem 28. By the engagement of said gear wheel 101 with the first of said racks 102 the stem 28, and therefore the core, is turned about one-third of a revolution, the center of the turning movement being when the mold is fully opened, due to the lowering of the outer tracks 62, 62' between the divisions 15 and 16 of the circumference (Fig. 12). Between the divisions numbered 16 and 17 thereof, the turning is completed and the mold sections close again. A similar movement takes place between the divisions numbered 18 and 20 and a third movement between the divisions numbered 21 and 23, an interval in each case being allowed for the compression of the pulp body between the core and the mold sections. By means of the compression of the pulp body by the mold sections in four different positions relatively thereto the ribs, which would otherwise remain on the pulp body, are entirely eliminated. At the division numbered 24 the outer tracks begin to descend and consequently the mold sections are open, and at the division numbered 25 the inner tracks also begin to descend, so that the mold leaves the core.

Immediately thereafter, as shown in Fig. 3, said core is, by upper and lower descending cam tracks 104, pivoted at their ends, as shown at 106, to the cam track 87, and also to horizontal cam tracks 107, caused to enter an open end, best shown in Fig. 25, of an oven 108, (Fig. 5) consisting of sections fitted together end to end and each section having side walls 109, a bottom 111, supported upon channel irons 112 supported on the frame of the apparatus, both walls and bottom being lined with fire brick 113, and top plates 114. In the outer wall of each section are openings 116 to permit entrance of air around oil burners 117, and outlet openings 118. In each section is a section of a heating chamber 119, closed at the sides and bottom, the side walls of the heating chambers being suspended from the top plates 114. Each oven section also contains two air conduits 121, which are ribbon-like in shape and of a tortuous form, so as to present a large extent of surface to be heated by the oil burners, said conduits being connected at their lower ends with the external atmosphere through holes in the bottom of the oven section, and at their upper ends with the interior of the heating chamber through holes in the bottom of said chamber. Covers 122 are hinged, as shown at 123, to the top plates 114 of said oven sections, and the inner edges of said covers extend very closely to the cores, so that said inner edges form a narrow slot through which said cores travel. The oven sections are bolted together by bolts through their end flanges 124, and the heating chamber sections are similarly bolted to each other through their end flanges 126. The cores, with the pulp bodies thereon, travel through said heating chambers for a considerable distance, say fifty feet, and are subjected therein to the heat derived from the oil burners directly and reflected from the fire brick, and also to the drying action of air drawn by heat upward through the conduits and allowed to escape through the slot between the inner edges of the cover plates.

At the same time the coating of paraffin on the core acquires great fluidity on account of the heat, and thoroughly penetrates the pulp body. In this manner only can the pulp body be economically and uniformly saturated with paraffin.

Said pulp bodies are exposed to an intense heat for a short time only, but if this exposure were too long, as, for instance, on account of the stoppage of the machine, they would be raised to ignition temperature by the great heat to which they are subjected. To avoid this result there is provided a longitudinal shaft 127 from which extend rocking arms 128, from the outer ends of which depend links 129, to the lower ends of which are connected vertically slidable brackets 131, which support the upper and lower tracks 107. In case of stoppage of the machine said shaft 127 is rocked, thereby raising said tracks 107 and the stems 28 and cores 40, and, at the same time, by reason of the upper portion of said cores having a conical form, raising the covers 122. The horizontal tracks are connected at their ends, as shown in Fig. 32, to the adjacent upper and lower tracks by a pin and slot connection, to permit the rise of the tracks 107. Rearwardly extending from the hinges 123 of said cover plates are arms 132 carrying counterbalance weights 133, which, when the covers 122 are raised through a certain angle, overbalance them so that they open fully. By this means the heating chamber is opened at the top, and at the same time the cores and pulp bodies thereon are withdrawn from the heating chamber.

The core stems are now raised from the heating chamber by means of ascending upper and lower tracks 134, 134' which are connected together by yokes 136, the lower track being pivoted to an end of a circular track 137 (Fig. 32) supported by standards 138, supported upon an arm 139 of an end piece 140, slidable in longitudinal guides 141 and the base of which has a rack 142 which is engaged by a pinion 143 upon a horizontal transverse shaft 144, on which shaft is secured a segment 146 of a grooved wheel in which groove is contained a cable 147 by means of which is suspended a heavy weight 148. By means of this weight the end piece 140 is maintained always at its outermost position at the farthest possible distance from the remainder of the frame of the apparatus, thereby taking up any lost motion between the parts, and at the same time allowing said parts to contract when necessary. In said end piece is a vertical shaft 149 upon which are mounted upper and lower idle wheels 151 for guiding the upper and lower rollers around the core stem.

The track 137 at the rear is extended in the longitudinal direction of the apparatus and the cores are carried by said track into contact with a series of ironing devices, particularly shown in Figs. 26 to 29. Each ironing device comprises an elongated heating chamber 152 having therein a perforated gas pipe 153, the top of said chamber having escape openings 154. In the side of the chamber next to the core is secured an ironer, preferably made of bronze, three such ironers 155, 156, 157, being here shown, for ironing different parts of the circumference of the paper body. The ironer 155 is of greater width than the others, and is intended for ironing the part of the core of the greatest diameter. The ironer 156 has a concave face for ironing the part of the paper body at which the diameter contracts and the ironer 157 has a face of ogee form for ironing the remainder of the pulp body. Each heating chamber is adjustable on its transverse supports by means of a screw 158, the stem of which can turn in a longitudinal channel iron 159 secured to the transverse channel iron, and which is screwed through a foot 161 extending from said heating chamber, said heating chamber being finally secured in place, when adjusted, by means of a bolt 162 extending through said transverse channel-iron and through a slot 163 in said foot.

The paper body is given a rotary motion so as to roll on the ironing device with as little sliding friction as possible. For this purpose the gear wheel 101, which was used to rotate the core stem 28 for the purpose of eliminating the ribs on the paper body, is now also used to produce the desired rotary motion for the first ironing action, by means of the ironer 155, and for this purpose it is caused to engage a stationary rack 164 (Fig. 30). In like manner, the core stem 28 is turned by means of the gear wheel 98 hereinbefore described, which engages a stationary rack 166, and again it is turned by means of the gear wheel 96 which engages a stationary rack 167. All of these racks 164, 166 and 167 are secured by suitable brackets 168 to a longitudinal plate 169 supported upon transverse channel irons 171. The gear wheels 101, 98 and 96 are of such diameters that the core will be caused to be rotated thereby at such angular velocity that there will be as nearly as possible rolling friction only between the paper body and the faces of the ironers.

The paper body has now to be trimmed at the top. For this purpose there is secured to an upright 172, a knife 173, which is pressed by a coiled spring 176 against the paper body, and makes a circular cut in the paper body at the desired height, while the paper body is rotating with the core.

The paper body is now completed and must be removed from the core. The core spindle is caused to descend by means of a pair of downwardly sloping tracks 177 (Fig. ) which lead to upper and lower idle wheels 178 upon a vertical shaft 179 supported in bearings 181 suitably mounted on the frame of the machine, and by means of said idle wheels the pulp body is brought into a position in which it can be grasped by a pair of jaws 182, pivoted, as shown at 183, on a wheel 184 rotatable upon a suitably supported stationary shaft 186, said jaws having arms 187 which have, pivotally connected thereto, ends of links 188, the other ends of which are pivotally connected to blocks 189 slidable radially in guideways 191 on said wheel, said blocks having on their under sides cam rollers 192, which roll in a cam groove 193 on the upper side of a stationary table 194 secured to said stationary shaft. By means of a bend 196 in said cam groove, said jaws are caused to clamp the body while the core within said body is traveling with the body, the roller 37 traveling upon a track 197 immediately above the center of the body clamped by said jaws. A stationary disk or plate 198 is secured to the shaft 186, and on the under side of said disk is secured a short rack 199. This rack engages the gear wheel 101 and imparts a slight rotation to the core stem and core. The turning of the core within the paper body, while the latter is firmly clamped by the clamp jaws, causes the adhesion of the core to the finished body, due to the paraffin coating of said core, to be broken. Said track 197 then gradually rises, thereby withdrawing the core upward out of the body, which is still clamped by said jaws. At a further bend 201 in the cam groove, the jaws open and the finished body drops therefrom into any suitable receptacle, not shown.

The core and stem are now carried by the roller 37 around another pair of upper and lower idle wheels 202, 203, and the track now proceeds in a straight direction toward the paraffin tank for a succeeding operation.

I claim:—

1. In combination, a tank for containing pulp, two endless series of mold sections, means for causing the sections of the two series to travel around predetermined paths, portions of the paths of the two series being located within a tank, the mold sections of one series being perforated to permit the water of the pulp, but not the solid pulp, to pass therethrough, means for pressing together the mold sections traveling in the parts of the paths within the tank, and means located outside the tank adjacent to the path of the other series for drying the pulp on the sections of said latter series.

2. In combination, a tank for containing pulp, two endless series of mold sections, means for causing the sections of the two series to travel around predetermined paths, portions of the paths of the two series being located within a tank, the mold sections of one series being perforated to permit the water of the pulp, but not the solid pulp, to pass therethrough, means for pressing together the mold sections traveling in the parts of the paths within the tank, and means located outside the tank adjacent to the path of the other series for removing the pulp from the sections of said latter series.

3. The combination of an annular tank, a vertical shaft, about the axis of which the tank can rotate, upper and lower sprocket wheels rotatable with the tank about said axis, rollers between the teeth of said sprocket wheels, tubes around which said rollers roll, upper and lower pairs of links having apertures through which said tubes extend, vertical stems in said tubes, hangers attached to the upper ends of said stems, cores attached to their lower ends, rollers supporting said hangers, and tracks upon which said latter rollers roll, said tracks being of such form that the cores, in the movement of said rollers on said track, descend into, and ascend from, said tank.

4. The combination of a tank for containing pulp, means for causing a core to descend into, and ascend out of, the pulp in said tank, means for causing a portion of the pulp therein to adhere to the core, means for heating the pulp upon the core, means for removing the dry pulp from the core, and means for cooling the core.

5. The combination of a tank for containing pulp, means for causing a core to descend into, and ascend out of, the pulp in said tank, means for causing a portion of the pulp therein to adhere to the core, means for heating the pulp upon the core, means for removing the dry pulp from the core, and a blower for blowing air against the core.

6. The combination of a rotary tank, an endless series of cores, means for moving said cores along an endless path, a portion of said path being circular and coaxial with the axis of rotation of the tank, means for causing the angular speed of the cores in the said circular portion of their path to be the same as that of the tank, means for causing the cores in said circular portion of their path to descend into, and ascend from, the tank, means for causing pulp from the tank to be deposited on the cores while therein, and means in the remaining portion of said path for removing the pulp from the cores.

7. The combination of a rotary tank, an endless series of cores, means for moving said cores along an endless path, a portion of said path being circular and coaxial with the axis of rotation of the tank, means for causing the angular speed of the cores in the said circular portion of their path to be the same as that of the tank, means for causing the cores in said circular portion of their path to descend into, and ascend from, the tank, and means in the remaining portion of said path for drying the pulp and for removing it from the cores.

8. The combination of an annular rotary tank for containing pulp, cores, means for causing said cores to descend into, and ascend out of, said tank, pairs of stuffing boxes in the bottom of the tank, lifter rods slidable through said stuffing boxes, means, operatively connected to lower portions of the rods, for raising and lowering the rods with the motion of the tank, and means carried by the upper portions of the rods for pressing the pulp about the cores.

9. The combination of an annular rotary tank for containing pulp, cores, means for causing said cores to descend into, and ascend out of, said tank, pairs of stuffing boxes in the bottom of the tank, lifter rods slidable through said stuffing boxes, means, operatively connected to lower portions of the rods, for raising and lowering the rods with the motion of the tank, pivoted mold sections carried by the upper portion of one rod of each pair, each section comprising ribs and a facing of wire netting, and means carried by the other rod of each pair for pressing the mold sections against the pulp around a core in the tank.

10. Means for forming a pulp vessel, a core, mold sections pivoted to swing to and from the core and each comprising a facing of wire netting and a support for said facing, said mold sections when closed together around the core contacting with one another at a distance from the core substantially equal to the thickness of the pulp vessel which is to be made.

11. The combination of a tank, a series of cores, means for moving said cores into, and out of, the tank, means for pressing pulp in the tank around the cores, individual devices for operating said pressing means to press the pulp around the cores, and a cam for operating said devices.

12. The combination of a tank, a series of cores, means for moving said cores into, and out of, the tank, means for pressing pulp in the tank around the cores, individual devices for operating said pressing means to press the pulp around the cores, a cam for operating said devices, and means for rendering said cam inoperative when desired.

13. In combination, a rotatable tank for paper pulp, movable body forming devices, means whereby said tank and devices are rotated in unison, said devices comprising means for pressing the water from the body at such a location that it can flow back to the tank, and means for continuously supplying the tank with comparatively dry pulp.

14. In combination, a tank, rods extending in said tank, mold sections raised and lowered by the respective rods, and means automatically operated in relation to said raising and lowering for opening and closing said mold sections.

15. In means for forming pulp hollow ware, the combination of an endless series of perforated outer mold members, means for pressing paper pulp, means for successively bringing the members of the series into operative relation with said pressing means, whereby paper pulp is pressed against the inner surface of each member of the series in succession, and means automatically actuated with the movement of said latter means whereby the pulp bodies are removed from said mold members.

16. In combination, a rotatable tank for paper pulp, movable body-forming devices, means whereby said tank and devices are rotated in unison, said devices comprising means for pressing the water from the body at such a location that it can flow back to the tank, and a screw feeder for feeding comparatively dry pulp to the tank.

17. In combination, a tank, rods extending into the tank, movable mold sections raised and lowered by one of said rods, and operative connections between said mold sections and the other rod for opening and closing said mold sections.

18. In combination, a tank, rods extending into the tank, mold sections carried by one of said rods, and operative connections between said mold sections and the other rod for opening and closing said mold sections.

19. In combination, a rotatable tank, lifter rods, pivoted mold sections carried by one of said lifter rods, and operative connections between said mold sections and the other lifter rod for opening and closing said mold sections.

20. In combination, a rotatable tank, rods extending into the tank, movable mold sections raised and lowered by one of said rods, and operative connections between said mold sections and the other rod for opening and closing said mold sections.

21. In combination, a rotatable tank, lifter rods movable through the bottom of the tank, pivoted mold sections carried by one of said lifter rods, and operative connections between said mold sections and the other lifter rod for opening and closing said mold sections.

22. In combination, a tank, rods therein, movable mold sections carried by one of said rods, operative connections between said mold sections and the other rod for opening and closing said mold sections, a roller on said latter rod, and a cam track engaging said roller to actuate it in the rotation of the rod.

23. In combination, a tank, rods therein, movable mold sections carried by one of said rods, operative connections between said mold sections and the other rod for opening and closing said mold sections, rollers on said rods, and cam tracks engaged by said rollers.

24. In combination, a rotatable tank, lifter rods movable through the bottom of the tank, pivoted mold sections carried by one of said lifter rods, operative connections between said mold sections and the other lifter rod for opening and closing said mold sections, rollers on the bottoms of said lifter rods, and cam tracks engaging said rollers to actuate the same in their rotation.

25. In combination, a tank, rods therein, movable mold sections carried by one of said rods, operative connections between said mold sections and the other rod for opening and closing said mold sections, rollers on said rods, cam tracks engaged by said rollers, and independent means for raising and lowering one of said cam tracks.

26. In combination, a tank, rods therein, movable mold sections carried by one of said rods, means for raising and lowering said rod, operative connections between said mold sections and the other rod for opening and closing said mold sections, cores, and means for rotating the cores with the mold sections.

27. In combination, a tank, rods therein, movable mold sections carried by one of said rods, operative connections between said mold sections and the other rod for opening and closing said mold sections, cores, and means for rotating the cores with, and above, the mold sections.

28. In combination, a rotatable tank, lifter rods movable through the bottom of the tank, pivoted mold sections carried by one of said lifter rods, operative connections between said mold sections and the other lifter rod for opening and closing said mold sections, cores, and means for rotating the cores with the tank above the mold sections.

29. The combination of a rotatable tank, means for containing paper pulp, a series of molds rotating with said tank, and movable into and out of the tank, said molds comprising perforated material permitting liquid, but not the solid, constituents of the pulp to pass therethrough, an endless series of cores, means for moving each core in succession into the interior of one of said molds within the tank, and means for exerting the pressure on pulp between the core and the mold within the tank.

30. The combination of a core, a mold, means for forming a body of paper pulp therebetween, means for removing the mold from the core, means for turning one of said elements, the core and the mold, relatively to the other, and means for pressing the mold against the core.

31. The combination of a tank for containing paper pulp, a core, a mold, means for dipping said core and mold into the tank to receive therebetween paper pulp, means for pressing the mold against the core, means for raising the core and mold and the pulp therebetween out of the tank, means for removing the mold from the core, means for imparting a turning movement of one of said elements, the core and the mold, relatively to the other, and means for again pressing the mold against the core.

32. The combination of a core, mold sections, means for forming a body of paper pulp between the mold sections and the core, and means for repeatedly removing the mold sections from the core, and alternately therewith imparting a rotary motion to the core and compressing the mold sections around the core.

33. The combination of a rotatable tank, a core rotating therewith, mold sections within the tank, means for causing the core to descend into said tank and within the mold sections, means for closing the mold sections around the core within the tank, means for raising said core and closed mold sections out of the tank, and means for repeatedly removing the mold sections from the core, and alternately therewith imparting a rotary motion to the core and again compressing the mold sections around the core.

34. The combination of a rotatable tank, a core rotating therewith, mold sections within the tank, means for causing the core to descend into said tank and within the mold sections, means for closing the mold sections around the core within the tank, means for raising said core and closed mold sections out of the tank, a gear wheel secured to said core, a stationary disk around which the core revolves, racks secured thereon at intervals and adapted to engage said gear wheel to rotate the core, and an angular guide also secured to the core and adapted to engage the edge of said stationary disk to prevent rotation of the core during said intervals, said stationary disk being recessed adjacent to said racks to permit said guide to turn.

35. In combination, a tank for containing paper pulp, a core and a mold, means for introducing and removing the core and mold into and from said tank, means for compressing the pulp between the core and the mold, an oven, and means for introducing and removing said core and pulp body into and from said oven.

36. In combination, a core, a carrier therefor, means for forming a pulp body on said core, an oven having a slotted top and open at the ends, and means for guiding said core carrier so that said pulp body passes through said open ends while the core carrier moves in said slot.

37. In combination, a core, a carrier therefor, means for forming a pulp body on said core, an oven open at the ends, a heating chamber in said oven open at the ends and having a slotted top, and means for guiding said core carrier so that the core passes through said heating chamber.

38. In combination, a core, a carrier therefor, means for forming a pulp body on said core, an oven, a heating chamber in said oven, a hot air tube leading through said oven and discharging into said heating chamber, and means for guiding said core carrier so that the core passes through said heating chamber.

39. In combination, a core, a carrier therefor, means for forming a pulp body on said core, an oven, removable covers at the top of the oven, and means for guiding said core carrier so that the core passes through said oven.

40. In combination, a core, a carrier therefor, means for forming a pulp body on said core, an oven, a heating chamber in said oven and having a slotted top, removable covers over said top, and means for guiding said core carrier so that the core passes through said heating chamber.

41. In combination, a core, a carrier therefor, means for forming a pulp body on said core, an oven, removable covers at the top of the oven, counter-balance weights therefor, and means for guiding said core carrier so that the core passes through said oven.

42. In combination, a core, a carrier therefor, means for forming a pulp body on said core, an oven, removable covers at the top of the oven, means for guiding said core carrier so that the core passes through said oven, and means for raising the cores out of said oven.

43. In combination, a core, a carrier therefor, means for forming a pulp body on said core, an oven, a heating chamber in said oven having a slotted top, removable covers over said top, means for guiding said core carrier so that the core passes through said heating chamber, and means for raising the cores out of said heating chamber.

44. In combination with core carriers, a track for said carriers, a suitable end piece supporting a part of said track, a rack on said end piece, a pinion engaging said rack, an arm extending from the shaft of said pinion, and a weight suspended from said arm.

45. In combination with core carriers, a track for said carriers, a suitable end piece supporting a part of said track, idle wheels thereon, a rack on said end piece, a pinion engaging said rack, a segment on the shaft of said pinion, a cord around said segment and a weight suspended from said cord.

46. In combination, a core, a carrier therefor, means for forming a pulp body on said core, an oven open at the ends, and having an open top, a track for said core carriers above said oven, pin and slot connections between said track and the adjacent tracks, and means for guiding said core carrier so that the core passes through said oven.

47. The combination of a core carrier, a core carried thereby, means for forming a pulp body on said core, an ironer having a smooth surface, means for applying said ironer to said pulp body, and means for heating said ironer.

48. The combination of a core carrier, a core carried thereby, means for forming a pulp body on said core, an ironer having a smooth surface, means for moving said pulp body against said ironer, and means for heating said ironer.

49. The combination of a core carrier, a core carried thereby, means for forming a pulp body on said core, an ironer having a smooth surface, means for rotating and moving longitudinally said pulp body against said ironer, and means for heating said ironer.

50. The combination of a core carrier, a core carried thereby, means for forming a pulp body on said core, an ironer having a smooth surface, means for rotating the core to permit it to roll against said surface, and means for heating said ironer.

51. In combination, a core carrier, a core carried thereby, a gear wheel on said carrier, an ironer having a smooth surface, means for heating said ironer, and a rack arranged to mesh with said gear wheel and extending in a direction to cause the core to roll on said smooth surface.

52. In combination, a core carrier, a core carried thereby, gear wheels on said carrier, a plurality of ironers each having a smooth surface, means for heating said ironers, and a corresponding plurality of racks arranged to mesh with the respective gear wheels and extending in a direction to cause the core to roll on said smooth surfaces.

53. The combination of a core carrier, a core carried thereby, means for introducing the same into a tank containing paper pulp, means for forming a pulp body on said core, an ironer having a smooth surface, means for rotating the core to permit it to roll against said surface, means for heating said ironer, and a cutter for making a circular cut in said pulp body while it rolls on said ironer.

54. In combination, a core carrier, a core carried thereby, jaws adapted to grip a paper body on said core, means for twisting the core in said paper body when so gripped by said jaws and means for raising the core relatively to said paper body so gripped.

55. The process of making pulp vessels which consists in dipping a core into a tank containing pulp, pressing the pulp in the tank on the core, raising the core from the tank with the pulp thereon, heating the pulp upon the core to dry the same, removing the dry pulp from the core, dipping the core into a tank containing molten paraffin, and repeating the operation with the same core.

56. The process of making pulp vessels which consists in dipping a core into a tank containing pulp, pressing the pulp in the tank on the core, raising the core from the tank with the pulp thereon, heating the pulp upon the core to dry the same, removing the dry pulp from the core, dipping the core into a tank containing molten material for preventing the sticking of the pulp to the core, and repeating the operation with the same core.

57. The process of making pulp vessels which consists in dipping a core into a tank containing pulp, pressing the pulp in the tank on the core, raising the core from the tank with the pulp thereon, heating the pulp upon the core to dry the same, removing the dry pulp from the core, covering the core with paraffin, and repeating the operation with the same core.

58. The process of making pulp vessels which consists in dipping a core into a tank containing pulp, pressing the pulp in the tank on the core, raising the core from the tank with the pulp thereon, heating the pulp upon the core to dry the same, removing the dry pulp from the core, covering the core with material for preventing the pulp from sticking to the core.

59. The process of making pulp bodies which consists in dipping a core in paper pulp, pressing pulp around the core, raising from the remaining pulp the core and the pulp pressed therearound, heating the pulp body to dry the same, gripping the body, twisting the core in the body, and removing the core.

60. The process of making pulp bodies which consists in dipping a core in paper pulp, pressing pulp around the core, raising from the remaining pulp the core and the pulp pressed therearound, heating the pulp body to dry the same, ironing the body on the core, gripping the body, twisting the core in the body, and removing the core.

61. The process of making pulp bodies which consists in dipping a core in melted paraffin, dipping the core in paper pulp, pressing pulp around the core, raising from the remaining pulp the core and the pulp pressed therearound, heating the pulp body to dry the same, ironing the body on the core, gripping the body, twisting the core in the body, and removing the core.

62. The process of making pulp bodies which consists in dipping a core in melted paraffin, dipping the core in paper pulp, pressing pulp around the core, raising from the remaining pulp the core and the pulp pressed therearound, turning the core and pulp body relatively to said pressing means, repeating the pressing operation, heating the pulp body to dry the same, ironing the body on the core, gripping the body, twisting the core in the body, and removing the core.

63. The process of making pulp bodies which consists in blowing air upon a core, dipping the core in melted paraffin, dipping the core in paper pulp, pressing pulp around the core, raising from the remaining pulp the core and the pulp pressed therearound, turning the core and pulp body relatively to said pressing means, repeating the pressing operation, heating the pulp body to dry the same, ironing the body on the core, gripping the body, twisting the core in the body, and removing the core.

64. The process of making pulp bodies which consists in blowing air upon a core, dipping the core in melted paraffin, dipping the core in paper pulp, pressing pulp around the core, raising from the remaining pulp the core and the pulp pressed therearound, turning the core and pulp body relatively to said pressing means, repeating the pressing operation, heating the pulp body to dry the same, ironing the body on the core, trimming the body, gripping the body, twisting the core in the body, and removing the core.

65. The process of making pulp bodies which consists in dipping a core in paper pulp, pressing pulp around the core, raising from the remaining pulp the core and the pulp pressed therearound, drying the pulp body, and removing the core therefrom.

In testimony whereof I have hereunto set my hand in the presence of two subscribing witnesses.

WILLIAM H. FULCHER

Witnesses:
F. M. WRIGHT,
D. B. RICHARDS.